May 21, 1940.　　F. W. BERWICK ET AL　　2,201,808
DEVICE FOR DISPENSING LIQUIDS
Filed Feb. 3, 1938　　4 Sheets-Sheet 1

INVENTORS
FREDERICK W. BERWICK
ALBERT G. BERWICK
By Norris & Bateman
ATTORNEYS

May 21, 1940.　　F. W. BERWICK ET AL　　2,201,808
DEVICE FOR DISPENSING LIQUIDS
Filed Feb. 3, 1938　　4 Sheets—Sheet 4

INVENTORS
FREDERICK W. BERWICK
ALBERT G. BERWICK
By Norris & Bateman
ATTORNEYS

Patented May 21, 1940

2,201,808

UNITED STATES PATENT OFFICE 2,201,808

DEVICE FOR DISPENSING LIQUIDS

Frederick William Berwick and Albert George Berwick, Streatham, London, England, assignors, by mesne assignments, to The De Laval Separator Company, New York, N. Y., a corporation of New Jersey Application February 3, 1938, Serial No. 188,550
In Great Britain February 12, 1937

7 Claims. (Cl. 225—26)

This invention relates to devices for dispensing liquids and has particular application to the dilution or solution of one liquid with or in another such, for example, as in the preparation of drinks by dilution of syrups or fruit essences with water. Hitherto in the preparation of such drinks it has been necessary to draw the component liquids from two sources by operating two separate taps or valves with no means for diluting in predetermined proportions or for preventing drips falling on table or counter.

The object of the present invention is to overcome the disadvantages set out above and to provide an improved apparatus designed for dispensing in one operation a small measured quantity of syrup or the like together with water for dilution in any desired quantity.

According to the invention an apparatus for dispensing liquids is provided wherein a device for delivering a measured quantity of liquid is arranged when operated to cause operation of a valve controlling the supply of a secondary or diluting liquid whereby both liquids are delivered simultaneously into one receptacle.

According to the preferred form of the invention the improved apparatus for dispensing liquids comprises a storage vessel and a device for delivering measured quantities of liquid from said vessel actuated by upward pressure of the receptacle to be filled, such upward pressure also causing operation of a water supply valve, means being also provided to regulate the water supply whereby the correct quantity for dilution is delivered into said receptacle simultaneously with the measured quantity.

One embodiment of the improved apparatus for dispensing liquids comprises a standard, a framework carried by said standard, storage vessels mounted in said framework, liquid measuring devices depending from said vessels, means for supplying water through said standard and said framework and means for simultaneously operating any of the said liquid measuring devices and a water supply device by the upward pressure of a receptacle to be filled.

Reference will now be made to the accompanying drawings which illustrate by way of example an apparatus constructed according to the invention and in which.

Figure 1:
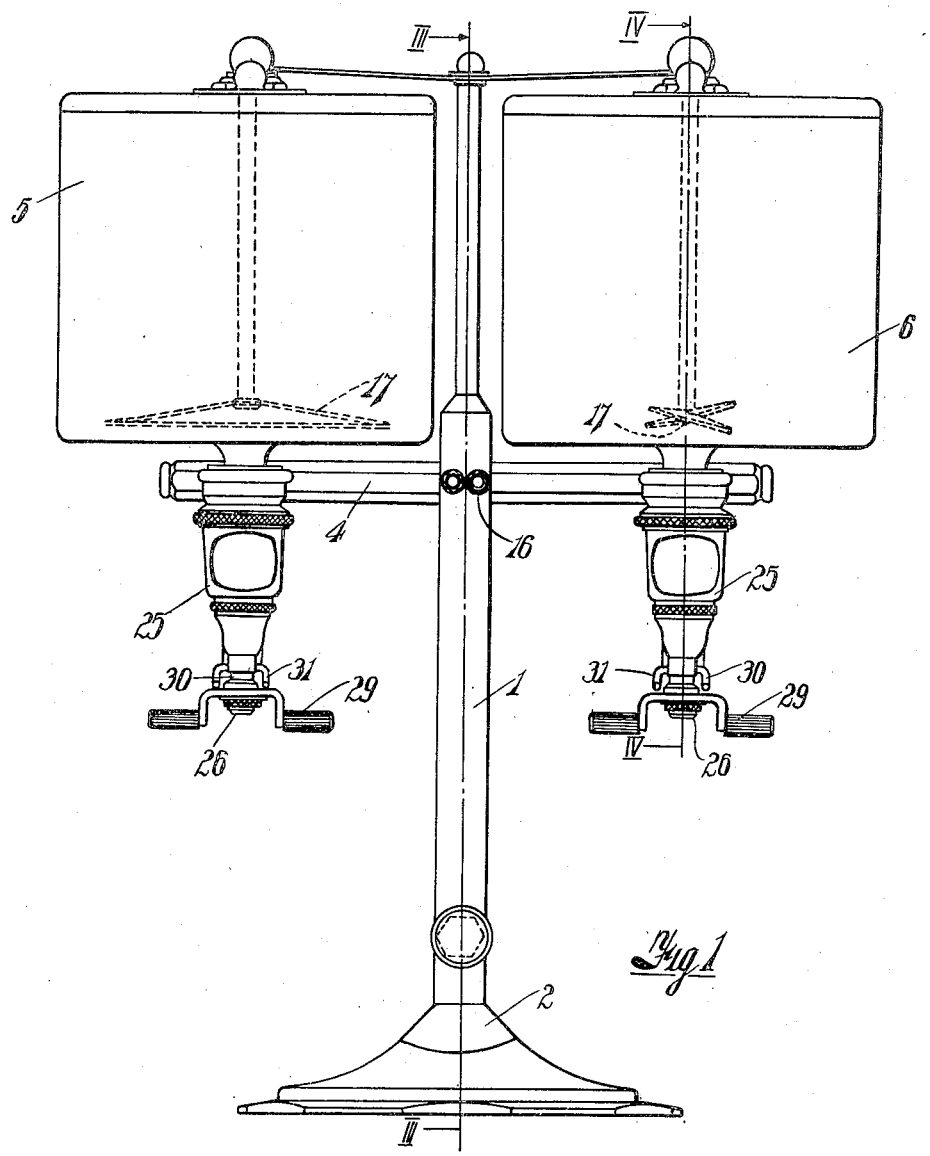
Fig. 1 is a front elevation of the apparatus.

In the construction illustrated the improved apparatus for dispensing liquids comprises a supporting standard 1 detachably mounted on a base plate 2 by means of a screw 3 and having fixed to it toward its upper end a horizontal cross bar 4 which serves as a support for vessels 5 and 6 containing the syrups or the like of which measured quantities are to be dispensed. The said standard 1 also serves for the supply of water for dilution and has attached to it at or near its base a water supply pipe 7 communicating with a passage 8 formed within the standard.

Figure 3:
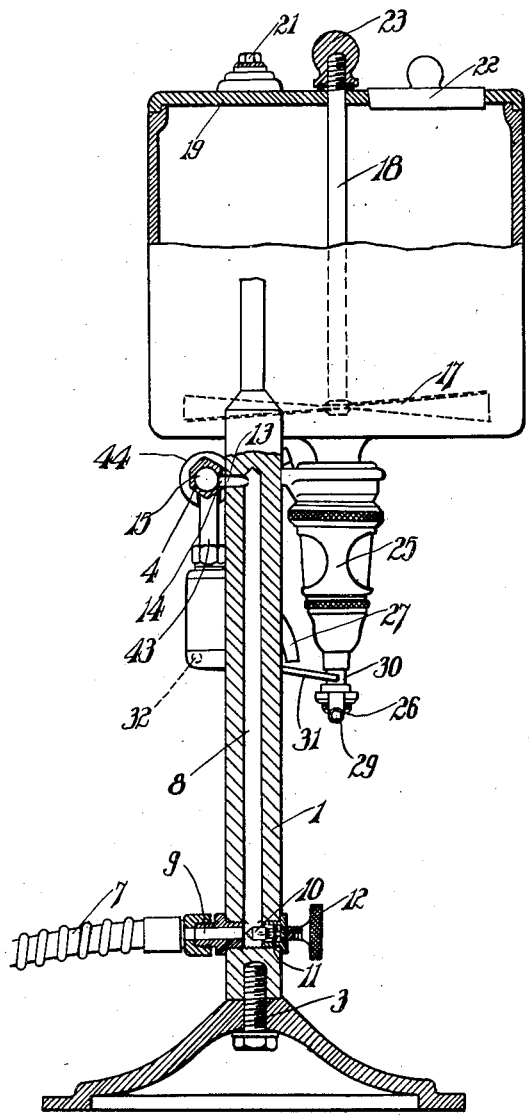
Fig. 3 is a sectional elevation taken on the line III—III of Fig. 1.

At the junction between an inlet 9 communicating with the pipe 7 and the base of the passage 8 is disposed a valve 10 (Fig. 3) which is normally used for volume control but which is also capable of being screwed inwards to a position in which its tapered end closes the inlet 9 to shut off the water supply altogether. Leakage of water along the valve stem is prevented by the use of a resilient cup washer 11 of frustoconical form and so arranged and mounted that only its outer edge makes contact with the wall of the valve chamber. The diameter of the cup washer is initially greater than that of the valve chamber so that under all conditions fluid tight contact will be maintained. The outer end of the valve stem carries a milled wheel 12 for manual operation.

The passage 8 within the standard 1 terminates at its upper end in a horizontal portion 13 which in turn communicates with a port 14 opening into a passage 15 which extends throughout the length of the transverse supporting bar 4 with suitable closure elements at the ends. This bar is of hexagonal shape in cross section or is otherwise formed to provide a flat surface which can be brought into close contact with the surface of the standard 1 when the bar is secured in position by means of nuts and bolts 16.

Figure 2:
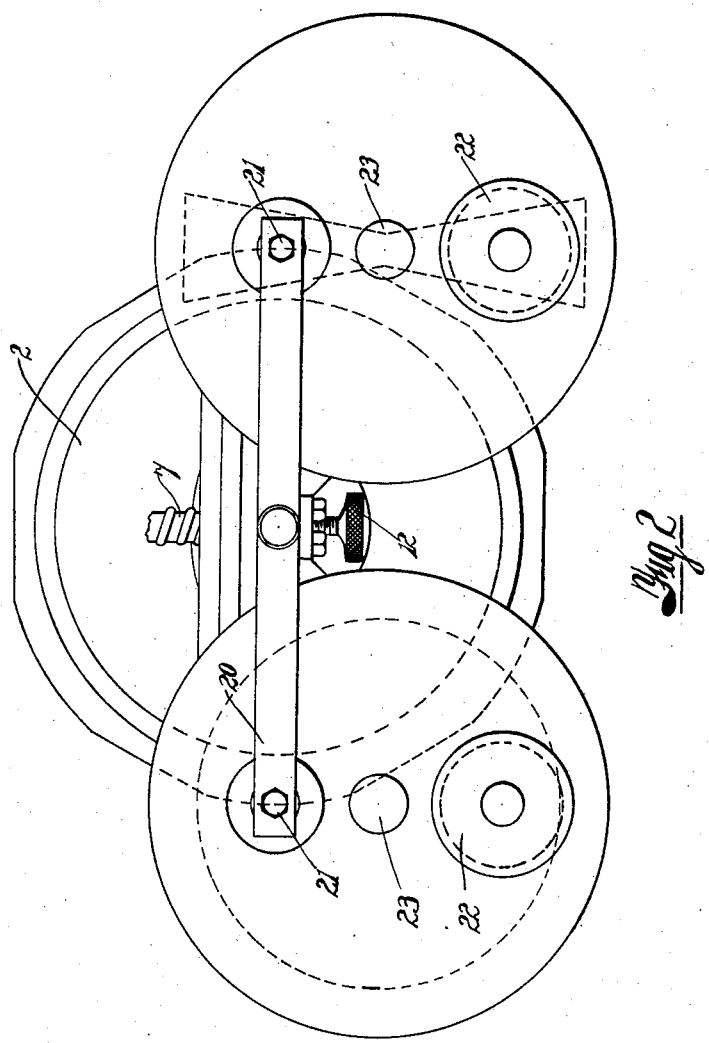
Fig. 2 is a plan of the apparatus shown in Fig. 1.

The standard 1, through the medium of the transverse bar 4, supports the two vessels 5 and 6 which are preferably of glass and are provided each with a hand operating agitating device. These agitators 17 are mounted on spindles 18 which depend from removable covers 19 normally held in position by a transverse member 20 (Figs. 1 and 2) fixed to the top of the standard 1 and secured by screws and nuts 21 to the top of each cover. Each cover 19 is also formed with a filling opening normally closed by a stopper 22 and the upper end of each spindle 18 which projects through the cover is provided with a knob 23 for manual operation. The base of each vessel 5 or 6 has an outlet 24 communicating with a device 25 for delivering measured quantities of liquid and preferably of the construction described in the specification of prior Patent No. 2,093,365. Adjacent the discharge outlet 26 from such measuring device is a nozzle 27 depending from a water supply valve housing 28. Extending laterally from each measuring device are two arms 29 adapted to be engaged by upward pressure of a tumbler or other receptacle in order to cause a measured quantity of liquid to be delivered from the device 25. The arms 29 are cranked as shown in order that the liquid in a filled receptacle cannot enter the discharge outlet 26.

In some cases it may be desirable to extend the spindle 18 of the agitator downwards through the outlet 24 so that it can be engaged and lifted by the valve member of the delivery device 25 and thus serve to remove any sedimentary matter which may tend to clog the outlet.

Engaging the operating member 30 of the measuring device immediately above the arms 29 is a forked lever 31 which is pivotally connected at 32 within a lower extension of the housing 28 of the water supply valve.

Figure 4:
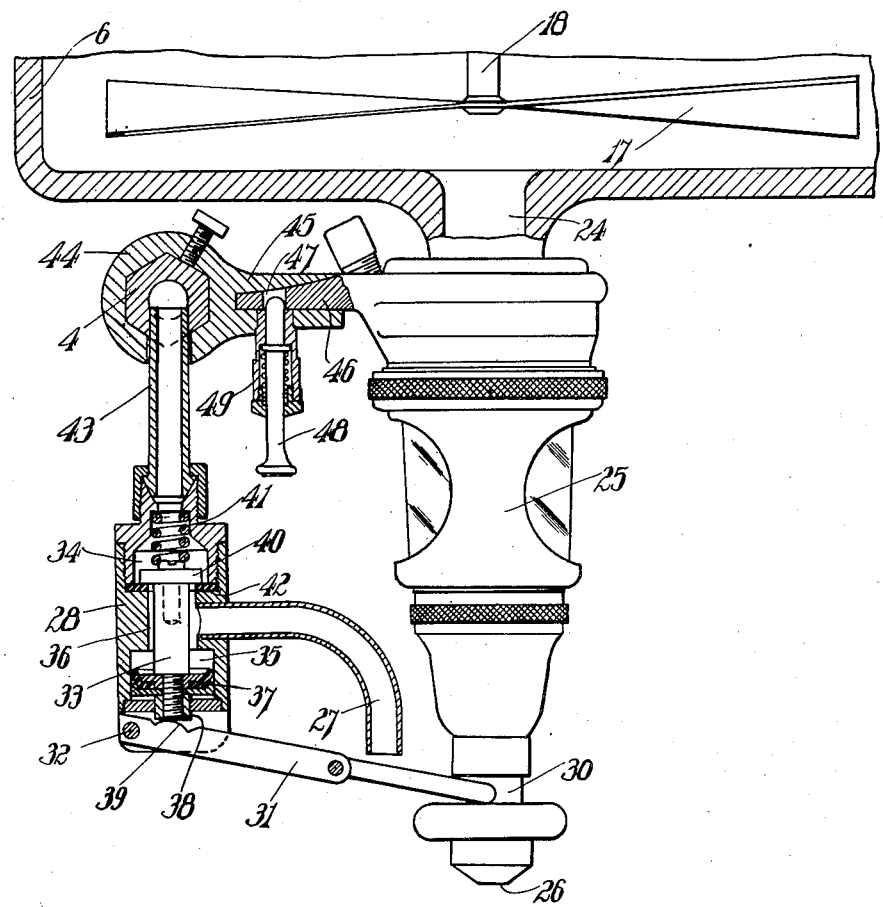
Fig. 4 is a sectional elevation on an enlarged scale taken on the line IV—IV of Fig. 1.

The mechanism of the water supply valve includes a stem 33 (Fig. 4) movable axially within the housing 28 which is divided into upper and lower chambers 34 and 35 connected by a passage 36 which communicates with the outlet 27. Movable within the lower chamber 35 is a piston containing a cup washer 37 which is constructed in a manner similar to the washer 11 so as to prevent leakage of water along the lower part of the stem 33 and through the base of the valve housing. The lower end of the stem 33 which projects below the housing 28 is formed with an abutment 38 adapted to be engaged by a curved section 39 on the upper edge of the lever 31 so as to impart axial movement to the said valve stem when the lever 31 is rocked upwardly about its pivot 32. In the upper chamber 34 of the valve housing is disposed a disc valve 40 above which is disposed a spring 41, whilst the valve seats on an annular washer or the like 42, the pressure of water under normal conditions assisting to maintain the valve in its normal position on its seating. The housing 28 is secured on the lower end of a short vertical pipe 43 which enters the hollow crossbar 4 as shown in Fig. 4.

The crossbar 4 also carries forwardly extending brackets 44 each of which terminates in flared lips 45 adapted to receive a lug or arm 46 extending rearwardly from the upper portion of the housing of the measuring device 25. The lug 46 is slotted at 47, the slot being engaged by a spring pressed plunger 48 carried in a housing 49 fixed below the lower lip 45. In this manner each vessel 5 or 6 is supported at its upper and lower ends it being necessary only to unscrew the nuts 21 and draw the plunger 48 downwardly to free a vessel 5 or 6 with its measuring device 25 for removal. This operation may be simplified, however, by eliminating the member 20 and employing separate devices such as spring clips on the edge of each vessel 5 or 6.

In the operation of the arrangement above described upward pressure of the rim of a receptacle on the arms 29 causes a measured quantity of liquid to be discharged through the outlet 26 of a measuring device 25. Simultaneously with the movement of the arms 29, however, the forked lever 31 is rocked causing the stem 33 to be lifted, the valve 40 to open and water to be discharged through the outlet 27 and enter the receptacle at the same time as the measured quantity of syrup or the like. Immediately the upward pressure on the arms 29 is relaxed the water supply is shut off and no drips will fall through the outlet 27 as any slight quantity of water which may be drawn back by the downward movement of the piston 37 will collect in the lower chamber 35 of the valve housing. The volume control device 12 can be set so that the water delivered through the pipe 27 synchronises accurately with the delivery of the measured quantity of syrup or the like so that when supplies of both are cut off simultaneously the receptacle is filled with a correctly proportioned solution. Alternatively, by maintaining pressure on the arms 29 water can be caused to flow indefinitely through the outlet 27 although no further measured quantity can be obtained from the device 25 until pressure on the arms 29 has been relaxed and the measuring chamber can refill.

The apparatus above described is capable of considerable modification as the transverse bar 4 can be arranged to carry more than two liquid receptacles. If a relatively large number of such receptacles is to be accommodated two standards 1 can be employed disposed one at each end of the cross bar 4, one only of such standards being arranged as above described for the supply of water.

We claim:

1. Apparatus for dispensing liquids comprising a standard, a framework carried by said standard, storage vessels mounted in said framework, a device for delivering measured quantities of a first liquid depending from each of said storage vessels, means for supplying a second liquid through said standard and said framework, and means for simultaneously operating any of the said devices for delivering measured quantities of the first liquid and a second liquid supply device, by the upward pressure of the receptacle to be filled.

2. Apparatus for dispensing liquids comprising a device, including a discharge outlet, for delivering measured quantities of one liquid, a conduit for supplying a second liquid having an independent discharge outlet, a valve in said conduit that is adjustable to regulate the rate of flow therethrough, a normally closed discharge valve for delivering the second liquid from said conduit, means, operable by the upward pressure of the receptacle to be filled, to simultaneously operate the first device and open said discharge valve, thereby causing a definite quantity of the second liquid, dependent on the adjustment of the regulating valve, to be discharged into said receptacle during the time required for delivery into the receptacle of said measured quantity of the first liquid, said means being operable, with continuing upward pressure of the receptacle, to maintain open said discharge valve after the delivery of a measured quantity of the first liquid is completed, thereby enabling the user to dilute the first liquid to any predetermined definite degree during the delivery of the measured quantity of the first liquid or to effect any higher desired degree of dilution.

3. Apparatus for dispensing liquids comprising a standard, a framework carried by said standard, storage vessels mounted in said framework, a device for delivering measured quantities of a first liquid depending from each of said storage vessels, means for admitting a second liquid through said standard and said framework, a valve for supplying said second liquid, a member associated with said supply valve and with said device for delivering measured quantities of the first liquid, for opening said supply valve, and means for simultaneously operating any of the said devices for delivering measured quantities of the first liquid and said second liquid supply valve by upward pressure of the receptacle to be filled, whereby said supply valve is maintained open as long as the upward pressure of the receptacle to be filled is maintained on the operating member of the device for delivering measured quantities of the first liquid, and means for regulating the supply of the second liquid whereby the correct quantity of the latter is delivered into said receptacle.

4. Apparatus for dispensing liquids comprising a hollow standard, a transverse frame member carried by said standard, storage vessels mounted in said framework, a device for delivering measured quantities of a first liquid depending from each of said storage vessels, a water supply connected to the base of said standard, means in said standard for controlling the volume of the water supply between zero and a predetermined level, a passage in said transverse frame member connected to the passage in said hollow standard, and valves in said passage in said transverse frame member for supplying the water as desired.

5. Apparatus for dispensing liquids according to claim 4 comprising further, brackets on said transverse frame member for supporting said devices for delivering measured quantities of the first liquid and said storage vessels, a detachable connection between each of said brackets and means forming part of each liquid measuring device, cooperating with said connection.

6. A device for dispensing liquids comprising a hollow standard, a transverse frame member having a passage therein connecting with the passage in said standard, at least two storage vessels, brackets on said transverse member supporting said storage vessels, a device for delivering measured quantities of a liquid depending from each of said storage vessels, an operating member on said device, means for moving said member upwards on upward pressure of a receptacle to be filled, a valve having a supporting member depending from said transverse frame member, a housing for said valve, a passage in said housing communicating with the passage in said transverse frame member, a spindle on which said valve is mounted, extending externally of said housing, an arm pivoted on said housing and engaging said spindle and also said operating member for the device for delivering measured quantities of liquid, whereby said valve is opened when the said operating member is pushed upwards by the receptacle to be filled, an outlet from said valve housing, a water supply connected to said hollow standard, a member for controlling between zero and a predetermined level the volume of water admitted, whereby when the receptacle to be filled is pressed upwards on the said operating member, water flows from said outlet into said receptacle simultaneously with the measured quantity of liquid and continues to flow until the upward pressure is removed, and means in the outlet of the device for delivering the measured quantity of liquid and within the said valve housing to prevent drips falling after said device and valve have been closed following removal of the filled receptacle.

7. Apparatus for dispensing liquids comprising, in combination, a measuring device for one liquid having a downwardly extending operating member constituting an outlet for the discharge of a measured quantity of said liquid therethrough into a receptacle, a valve for controlling a second liquid, arranged adjacent to said operating member and having means for discharging the second liquid into the same receptacle which receives the first mentioned liquid from said measuring device, and a lever coupled to said operating member and to said valve and operative by upward movement of said operating member to cause the measuring device to deliver a measured quantity of the first mentioned liquid and to simultaneously open said valve to deliver the second liquid.

FREDERICK WILLIAM BERWICK.
ALBERT GEORGE BERWICK.